(12) United States Patent
Inoue

(10) Patent No.: US 9,342,090 B2
(45) Date of Patent: May 17, 2016

(54) COMPOSITE OPERATING DEVICE

(71) Applicant: SUMITOMO WIRING SYSTEMS, LTD., Yokkaichi, Mie (JP)

(72) Inventor: Masatomo Inoue, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 214 days.

(21) Appl. No.: 14/045,113

(22) Filed: Oct. 3, 2013

(65) Prior Publication Data

US 2014/0102245 A1    Apr. 17, 2014

(30) Foreign Application Priority Data

Oct. 15, 2012    (JP) ................................. 2012-227935

(51) Int. Cl.
| | |
|---|---|
| *G05G 1/02* | (2006.01) |
| *G05G 1/10* | (2006.01) |
| *B60N 2/02* | (2006.01) |
| *H01H 25/00* | (2006.01) |

(52) U.S. Cl.
CPC .............. *G05G 1/025* (2013.01); *B60N 2/0228* (2013.01); *G05G 1/10* (2013.01); *H01H 25/002* (2013.01); *Y10T 74/2084* (2015.01)

(58) Field of Classification Search
CPC .. Y10T 74/2084; B60N 2/0228; G05G 1/025; H01H 25/002
USPC ............................................ 74/553; 200/337
See application file for complete search history.

(56) References Cited

U.S. PATENT DOCUMENTS

| | | | | |
|---|---|---|---|---|
| 3,916,721 | A * | 11/1975 | Egger .............................. | 74/553 |
| 6,906,700 | B1 | 6/2005 | Armstrong | |
| 7,908,713 | B2 * | 3/2011 | Yoshinaka et al. .............. | 16/441 |
| 8,987,621 | B2 * | 3/2015 | Inoue ............................ | 200/341 |
| 2009/0294259 | A1 | 12/2009 | Kuno et al. | |
| 2010/0193340 | A1 * | 8/2010 | Ujimoto ............... | B60N 2/0228 200/339 |
| 2013/0037392 | A1 | 2/2013 | Nakajima et al. | |

(Continued)

FOREIGN PATENT DOCUMENTS

| | | |
|---|---|---|
| EP | 1 126 482 A2 | 8/2001 |
| JP | A-2008-135324 | 6/2008 |

(Continued)

OTHER PUBLICATIONS

English Abstract of WO2008065815A1, Yukio et al., Jun. 2008.*

(Continued)

*Primary Examiner* — Vinh Luong
(74) *Attorney, Agent, or Firm* — Oliff PLC

(57) ABSTRACT

A composite operating device is provided which enables an operating member to be reliably guided in a sliding direction and achieves a simple structure for preventing disengagement of a slider. The composite device includes a base, a slider, and an operating member. The base includes a base main body, a guiding portion, and a restricting portion. The slider includes a guided portion and a restricted surface. The slider can slide in the sliding direction with the guided portion being restricted by first and second guiding surfaces. The restricting portion includes a sliding contact portion that restricts the slider and allows sliding of the slider by coming into sliding contact with the restricted surface. Also, the restricting portion has a shape that allows movement of the slider in a fitting direction by being deformed to bend in a direction in which the restricting portion is retracted from the slider.

8 Claims, 10 Drawing Sheets

(56) References Cited

U.S. PATENT DOCUMENTS

2014/0102244 A1* 4/2014 Inoue .............................. 74/553
2014/0102867 A1* 4/2014 Inoue ............................ 200/337

FOREIGN PATENT DOCUMENTS

WO  WO 2008/065815  *  6/2008  .......... Y10T 74/2084
WO  WO 2011/145241  A1  11/2011

OTHER PUBLICATIONS

European Search Report issued in European Patent Application No. 13184965.5 on Jan. 29, 2014.

* cited by examiner

COMPOSITE OPERATING DEVICE

BACKGROUND

The present disclosure relates to a composite operating device that is used to operate an electronic apparatus installed in a vehicle or the like.

Conventionally, among operating devices that are provided in various electronic apparatuses, a composite operating device including an operating member that is operable to rotate about a specific axis of rotation and also operable to slide in a direction orthogonal to the axis of rotation is known. For example, when installed in a vehicle such as an automobile, such a composite operating device is used to operate a car navigation system, a seat of the vehicle, or the like.

For example, JP 2008-135324A discloses a composite operating device including an operating member that is operable to rotate about a specific axis of rotation and also operable to slide in a direction orthogonal to the axis of rotation, a slider that rotatably retains the operating member and slides in the same direction as a sliding direction of the operating member in conjunction with a sliding operation of the operating member, an inner circumferential ring that retains the slider so as to allow the slider to slide in the sliding direction, and an outer circumferential ring that holds the slider from both sides in cooperation with the inner circumferential ring so as to restrict displacement of the slider in a direction away from the inner circumferential ring.

JP 2008-135324A is an example of related art.

BRIEF SUMMARY

With the composite operating device disclosed in JP 2008-135324A, the operating member can be operated to slide in any direction within a plane that is transverse to the axis of rotation. However, there is a need to reliably guide the operating member in a specific direction during a sliding operation of the operating member.

In addition, the composite operating device disclosed in JP 2008-135324A employs a structure in which the slider is held from both sides by the inner circumferential ring and the outer circumferential ring in order to prevent disengagement of the slider. Thus, there are problems in that the number of components is large, and assembly is complicated. Specifically, operations are necessary in which the operating member and the slider are placed inside the inner circumferential ring in advance, and in this state, the outer circumferential ring is attached so that the slider is held between the inner circumferential ring and the outer circumferential ring.

The present device, and variations thereof, solves problems such as those described above, and it is an object thereof to provide a composite operating device that enables the operating member to be reliably guided in the sliding direction and achieves a simple structure for preventing disengagement of the slider.

In order to solve the problems, the present composite operating device is operable to rotate about a specific axis of rotation and operable to slide in a specific sliding direction that is transverse to the axis of rotation. The composite operating device includes a base, a slider that is supported by the base so as to be slidable in the sliding direction relative to the base, and an operating member that is retained by the slider so as to be rotatable about the axis of rotation and is operable so as to slide in the sliding direction together with the slider. The base includes a base main body having an opposing surface that faces the slider in a direction parallel to the axis of rotation, a guiding portion protruding from the opposing surface toward the slider and guiding the slider in the sliding direction, and at least one restricting portion protruding from the opposing surface toward the slider at a position spaced apart from the guiding portion in a slide restriction direction that is transverse to the sliding direction and restricting displacement of the slider in a direction away from the base main body. The slider includes a guided portion that is shaped such that the guided portion can be removably fitted into the guiding portion in the direction parallel to the axis of rotation and is guided by the guiding portion in the sliding direction in the fitted state, and at least one restricted surface, the restricted surface being a surface that faces a side that is opposite to the opposing surface and extends parallel to the sliding direction and that is restricted by the restricting portion. The guiding portion extends in a direction parallel to the sliding direction and includes a first guiding surface restricting the guided portion in the fitted state from a first side with respect to the slide restriction direction and a second guiding surface restricting the guided portion in the fitted state from a side that is opposite to the first side with respect to the slide restriction direction. The slider can slide in the sliding direction with the guided portion of the slider being restricted by the first and second guiding surfaces. The restricting portion includes a sliding contact portion that, in the fitted state, comes into contact with the restricted surface from the side that is opposite to the opposing surface, thereby restricting the slider, and comes into sliding contact with the restricted surface in the sliding direction, thereby allowing the slider to slide. Also, the restricting portion is shaped such that, as the slider approaches the opposing surface in a fitting direction in a process until the guided portion is fitted into the guiding portion, the restricting portion comes into contact with the slider, thereby being deformed to bend in a direction in which the restricting portion is retracted from the slider and allowing the slider to move in the fitting direction.

According to a preferred embodiment, a structure in which the operating member and the slider are reliably guided in the sliding direction by the guiding portion of the base and the guided portion of the slider as well as a structure in which disengagement of the slider is prevented by the restricting portion of the base coming into contact with the restricted surface of the slider are constructed by mounting the slider to the base in the fitting direction. Specifically, the slider includes the guided portion, which is shaped such that the guided portion can be removably fitted into the guiding portion in the direction parallel to the axis of rotation and is guided in the sliding direction by the guiding portion in the fitted state. The guiding portion of the base extends in the direction parallel to the sliding direction and includes the first guiding surface, which restricts the guided portion in the fitted state from the first side with respect to the slide restriction direction, and the second guiding surface, which restricts the guided portion in the fitted state from the side that is opposite to the first side with respect to the slide restriction direction. Thus, a structure in which the operating member and the slider are reliably guided in the sliding direction without being displaced in the slide restriction direction relative to the base is constructed by mounting the slider to the base so that the guiding portion and the guided portion are in the fitted state. In addition, the slider includes the restricted surface, which is a surface that faces the side that is opposite to the opposing surface of the base and extends parallel to the sliding direction and that is restricted by the restricting portion. The restricting portion of the base includes the sliding contact portion, which, in the fitted state, comes into contact with the restricted surface from the side that is opposite to the opposing surface, thereby restricting the slider, and comes into sliding contact with the restricted surface in the sliding direction, thereby allowing the slider to slide. Also, the restricting portion is shaped such that, as the slider approaches the opposing surface in the fitting direction in the process until the guided portion is fitted into the guiding portion, the restricting portion comes into contact with the slider, thereby being deformed to bend in the direction in which the restricting portion is retracted from the slider and allowing the slider to move in the fitting direction. Thus, a structure in which disengagement of the slider is prevented by the restricting portion coming into contact with the restricted surface is constructed by mounting the slider to the base so that the guiding portion and the guided portion are in the fitted state.

In this case, it is preferable that the base includes, as the restricting portion, a first restricting portion and a second restricting portion that is located on a side of the guiding portion that is opposite to the first restricting portion with respect to the slide restriction direction and protrudes from the opposing surface toward the slider, and the slider includes, as the restricted surface, a first restricted surface and a second restricted surface that are provided corresponding to the first restricting portion and the second restricting portion, respectively, the first restricting portion including, as the sliding contact portion, a first sliding contact portion that, in the fitted state, comes into contact with the first restricted surface from the side that is opposite to the opposing surface, thereby restricting the slider, and comes into sliding contact with the first restricted surface in the sliding direction, thereby allowing the slider to slide, and being shaped such that, as the slider approaches the opposing surface in the fitting direction in the process until the guided portion is fitted into the guiding portion, the first restricting portion comes into contact with the slider, thereby being deformed to bend in a direction in which the first restricting portion is retracted from the slider and allowing the slider to move in the fitting direction, and the second restricting portion including, as the sliding contact portion, a second sliding contact portion that, in the fitted state, comes into contact with the second restricted surface from the side that is opposite to the opposing surface, thereby restricting the slider, and comes into sliding contact with the second restricted surface in the sliding direction, thereby allowing the slider to slide, and being shaped such that, as the slider approaches the opposing surface in fitting direction in the process until the guided portion is fitted into the guiding portion, the second restricting portion comes into contact with the slider, thereby being deformed to bend in a reverse direction of the direction of bending deformation of the first restricting portion and allowing the slider to move in the fitting direction.

With this configuration, the slider is restricted from opposite sides of the guiding portion with respect to the slide restriction direction. Thus, disengagement of the slider in the fitted state is even more reliably prevented.

Furthermore, in this case, it is preferable that the base further includes, as the restricting portion, a third restricting portion that is located on a side of a transverse plane that is opposite to the first restricting portion with respect to the sliding direction, the transverse plane containing the axis of rotation and being transverse to the sliding direction, and that protrudes from the opposing surface toward the slider and a fourth restricting portion that is located on a side of the transverse plane that is opposite to the second restricting portion with respect to the sliding direction and that protrudes from the opposing surface toward the slider, and the slider further includes, as the restricted surface, a third restricted surface and a fourth restricted surface that are provided corresponding to the third restricting portion and the fourth restricting portion, respectively, the third restricting portion including, as the sliding contact portion, a third sliding contact portion that, in the fitted state, comes into contact with the third restricted surface from the side that is opposite to the opposing surface, thereby restricting the slider, and comes into sliding contact with the third restricted surface in the sliding direction, thereby allowing the slider to slide, and being shaped such that, as the slider approaches the opposing surface in the fitting direction in the process until the guided portion is fitted into the guiding portion, the third restricting portion comes into contact with the slider, thereby being deformed to bend in a direction in which the third restricting portion is retracted from the slider and allowing the slider to move in the fitting direction, and the fourth restricting portion including, as the sliding contact portion, a fourth sliding contact portion that, in the fitted state, comes into contact with the fourth restricted surface from the side that is opposite to the opposing surface, thereby restricting the slider, and comes into sliding contact with the fourth restricted surface in the sliding direction, thereby allowing the slider to slide, and being shaped such that, as the slider approaches the opposing surface in the fitting direction in the process until the guided portion is fitted into the guiding portion, the fourth restricting portion comes into contact with the slider, thereby being deformed to bend in a reverse direction of the direction of bending deformation of the third restricting portion and allowing the slider to move in the fitting direction.

With this configuration, rotation of the slider about a straight line that passes through the slider, of straight lines in the transverse plane and parallel to the slide restriction direction, is suppressed. Accordingly, rattling of the operating member and the slider during sliding is suppressed.

Moreover, in the present preferred embodiment, it is preferable that the slider includes a cylindrical retaining portion that rotatably retains the operating member, a first restricted wall including the first restricted surface, and a second restricted wall including the second restricted surface, the first restricted wall having a shape extending in the sliding direction so as to contain one of tangents to the retaining portion that extend in the direction parallel to the sliding direction, and the second restricted wall having a shape extending in the sliding direction so as to contain the other of the tangents to the retaining portion that extend in the direction parallel to the sliding direction.

With this configuration, the distance between the first restricted wall and the second restricted wall is approximately equal to the diameter of the retaining portion. Thus, the dimension of the slider in the slide restriction direction is reduced.

Moreover, in the present preferred embodiment, it is preferable that the guiding portion includes a first guiding portion that is spaced apart from the axis of rotation in the slide restriction direction and includes the first guiding surface, and a second guiding portion that is positioned on a side of the axis of rotation that is opposite to the first guiding portion and includes the second guiding surface.

With this configuration, sliding of the slider is guided at two locations on opposite sides of the axis of rotation in the slide restriction direction. Thus, rotation of the slider about the axis of rotation is suppressed even more.

Moreover, in the present preferred embodiment, it is preferable that the sliding contact portion has a shape that comes into point or line contact with the restricted surface.

With this configuration, the friction force that acts between the sliding contact portion and the restricted surface is reduced. Thus, operating resistance during a sliding operation of the operating member is reduced.

As described above, according to the present preferred embodiment, it is possible to provide a composite operating device that enables the operating member to be reliably guided in the sliding direction and achieves a simple structure for preventing disengagement of the slider.

DETAILED DESCRIPTION

First Embodiment

A composite operating device according to a first embodiment will be described with reference to FIGS. 1 to 9.

Figure 1:
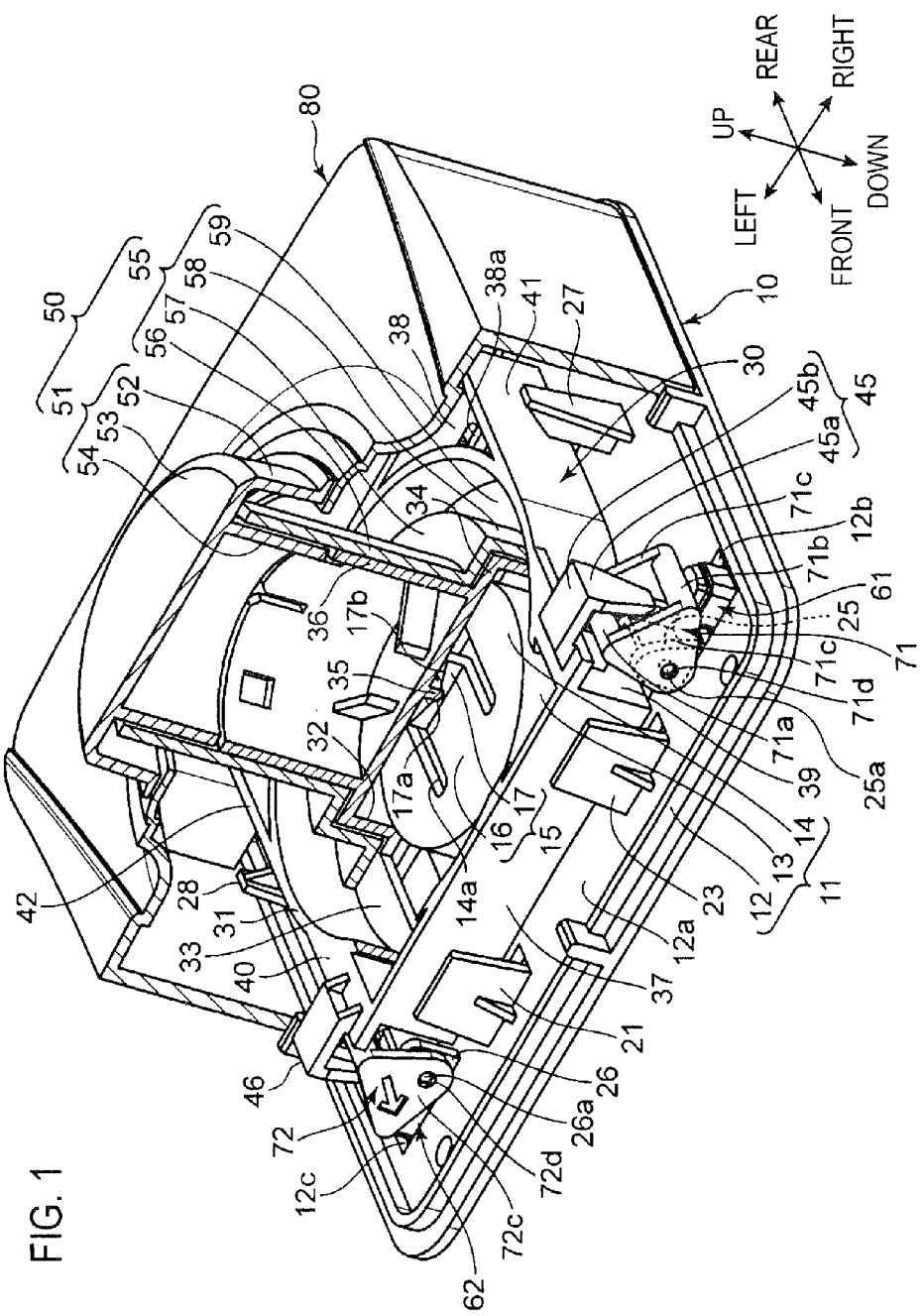
FIG. 1 is a partially cut-away perspective view of a composite operating device according to a first embodiment.

As shown in FIG. 1, a composite operating device of this embodiment includes a base 10, a slider 30 that is supported by the base 10 so as to be slidable in a specific sliding direction relative to the base 10, an operating member 50 that is operable to rotate about a specific axis of rotation and also operable to slide in the sliding direction, a first detecting element 61 that detects a sliding operation of the operating member 50 toward a first side, a second detecting element 62 that detects a sliding operation of the operating member 50 toward a second side, a first transmission member 71 that transmits an operating force acting on the slider 30 due to a sliding operation of the operating member 50 toward the first side to the first detecting element 61, a second transmission member 72 that transmits an operating force acting on the slider 30 due to a sliding operation of the operating member 50 toward the second side to the second detecting element 62, and a panel 80 that is attached to the base 10. In this embodiment, the base 10, the slider 30, and the operating member 50 have plane symmetry, where an orthogonal plane that is orthogonal to the sliding direction and passes through the axis of rotation is the plane of symmetry. However, one of ordinary skill in the art would appreciate that the components do not have to be arranged plane symmetrical.

In the following description, as indicated in FIG. 1, a direction that is parallel to the axis of rotation will be referred to as an "up-down direction," "vertical direction" or "fitting direction," the sliding direction of the operating member 50 and the slider 30 will be referred to as "left-right direction", and a direction that is orthogonal to each of the vertical direction and the left-right direction will be referred to as "front-rear direction," "slide restriction direction," "first bending deformation direction," or "third bending deformation direction." Moreover, a position in which the operating member 50 and the slider 30 are not displaced in the sliding direction relative to the base 10 will be referred to as "neutral position".

Figure 2:
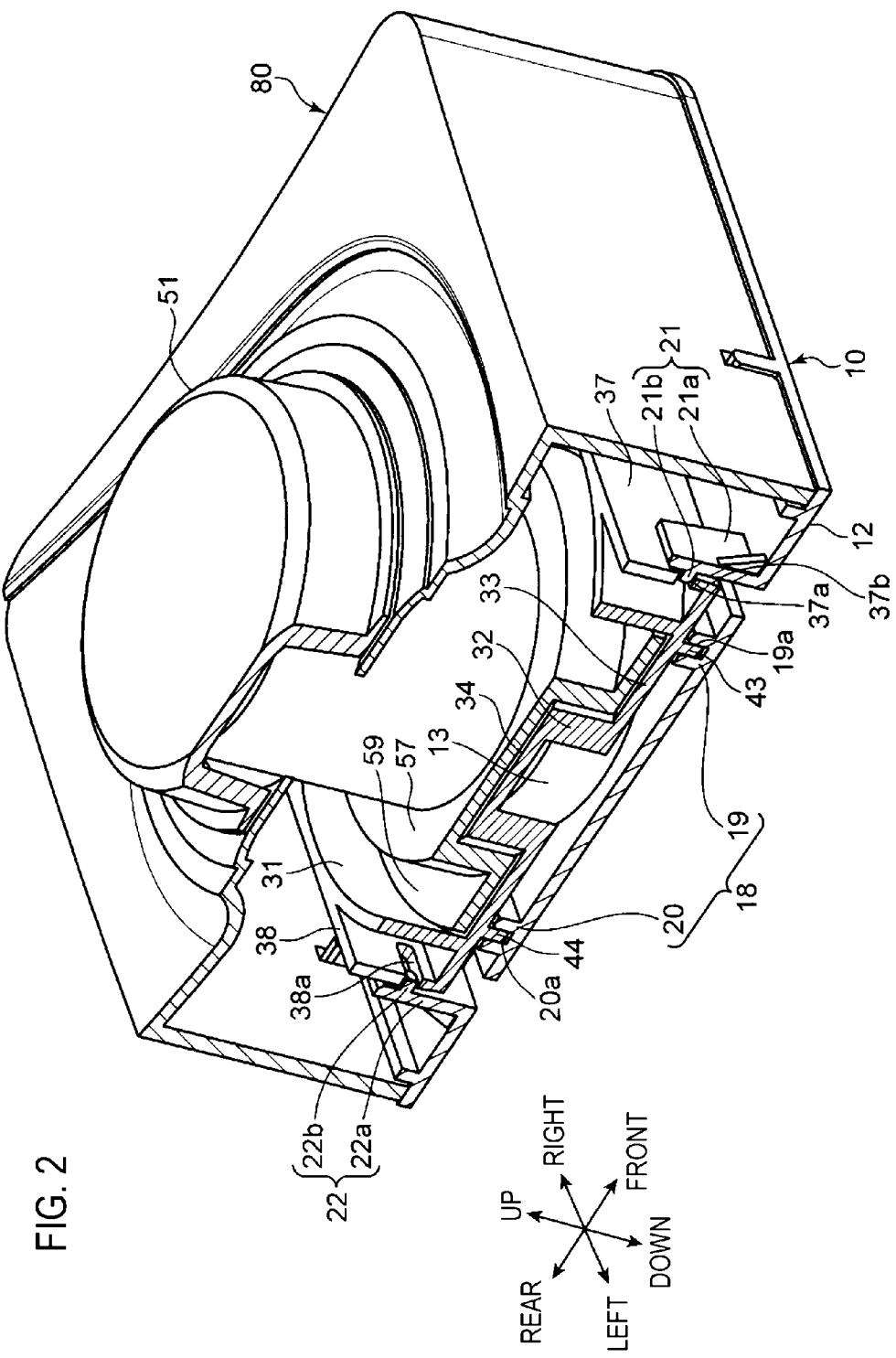
FIG. 2 is a perspective view showing a cross section viewed from a different angle than in FIG. 1.
Figure 3:
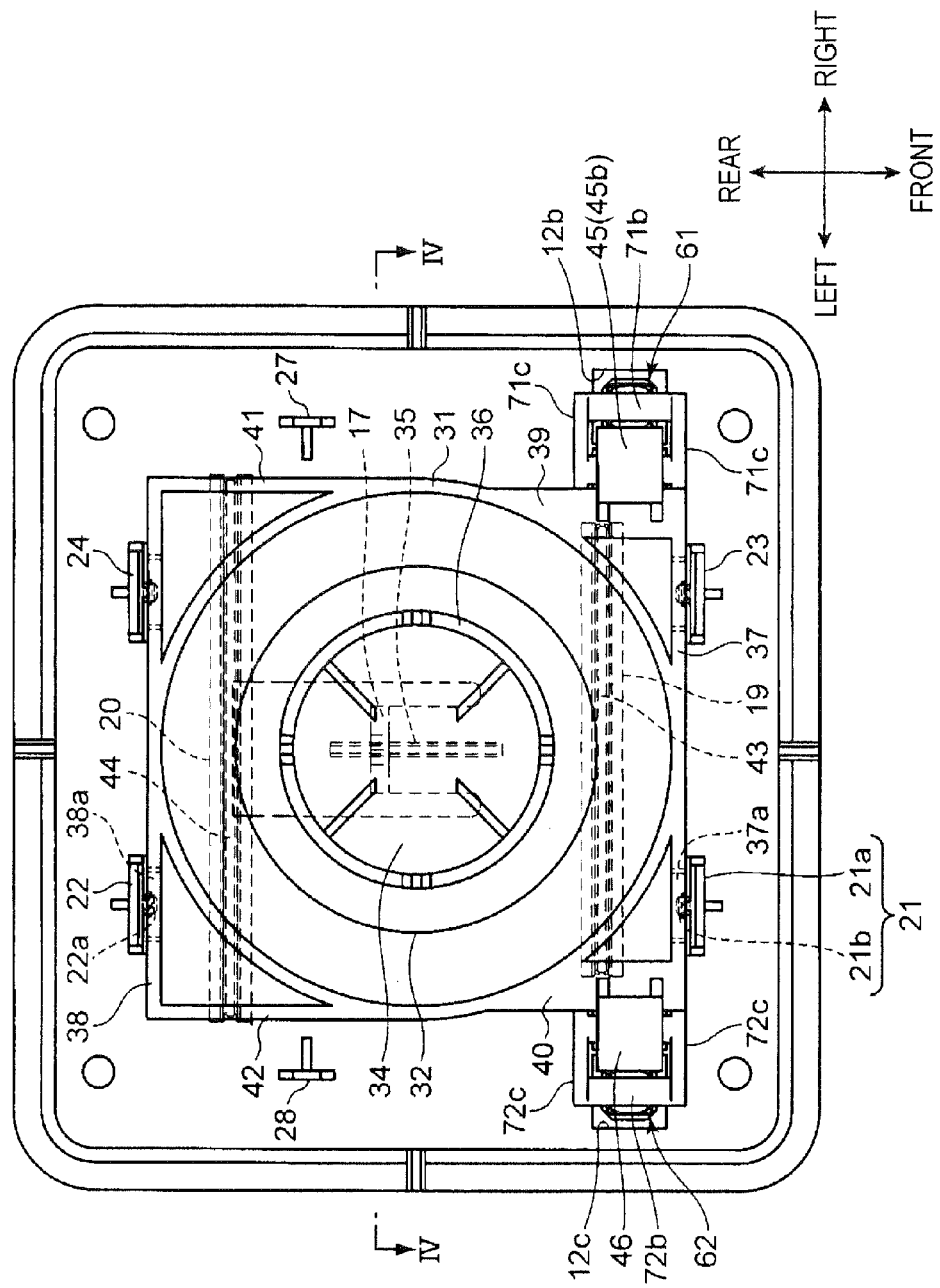
FIG. 3 is a plan view of the composite operating device shown in FIG. 1 in a state in which an operating member and a panel are omitted.

As shown in FIGS. 1 to 3, the base 10 has a base main body 11, a flexible portion 15 that can be deformed to bend in a predetermined direction relative to the base main body 11, a guiding portion 18 that guides the slider 30 in the sliding direction, a restricting portion that restricts displacement of the slider 30 in a direction (upward direction) away from the base main body 11, a first transmission member retaining portion 25 that retains the first transmission member 71, a second transmission member retaining portion 26 that retains the second transmission member 72, as well as a first stopper portion 27 and a second stopper portion 28 that abut against the slider 30 in the sliding direction. Note that the operating member 50 and the panel 80 are omitted from FIG. 3.

The base main body 11 has a flat plate portion 12 having an opposing surface 12a that faces the slider 30 in the vertical direction, a circumferential wall 13 extending upward from the opposing surface 12a, and an upper wall 14 that is connected to an upper end of the circumferential wall 13. As shown in FIG. 3, the flat plate portion 12 has a rectangular shape when viewed from above. The flat plate portion 12 has a first hole 12b that exposes the first detecting element 61 to the side of the slider 30 (upper side), and a second hole 12c that exposes the second detecting element 62 to the side of the slider 30 (upper side). The first hole 12b is formed in a right (the upper side in FIG. 3) end portion of the flat plate portion 12 in the sliding direction, and the second hole 12c is formed in a left (the lower side in FIG. 3) end portion of the flat plate portion 12 in the sliding direction. The circumferential wall 13 extends upward from a central portion of the flat plate portion 12. The upper wall 14 is parallel to the flat plate portion 12. Slits 14a are formed in the upper wall 14. The slits 14a extend rearward from respective positions that are spaced apart from each other in the sliding direction, and are shaped such that their rear ends are continuous with each other. Thus, the flexible portion 15 can be deformed to bend in the vertical direction relative to the upper wall 14.

The flexible portion 15 is integrally formed with the upper wall 14 so as to be continuous with the upper wall 14. The flexible portion 15 has a flexible piece 16 and a first engagement portion 17. The flexible piece 16 has a base end portion that is continuous with the upper wall 14 on one end side (front side) in the slide restriction direction and a displacement end portion that is an end portion on the side (rear side) that is opposite to the base end portion and constitutes a free end. That is, the flexible piece 16 is in the form of a cantilever extending from the upper wall 14 in the front-rear direction, and is capable of bending deformation so that its free end side is displaced in the vertical direction relative to the upper wall 14. The first engagement portion 17 is provided in the displacement end portion of the flexible piece 16. The first engagement portion 17 has a shape that gradually increases in vertical dimension from the center in the sliding direction toward the outer sides in the sliding direction. The first engagement portion 17 has a locking portion 17a that is formed at the center in the sliding direction, and a sliding surface 17b having a shape continuously extending from the locking portion 17a toward both of the outer sides in the left-right direction. The locking portion 17a locks the second engagement portion 35 by abutting against the second engagement portion 35 from both sides in the sliding direction, thereby retaining the slider 30 in the neutral position. The sliding surface 17b has a shape that linearly extends gradually upward from the locking portion 17a toward both of the outer sides in the sliding direction.

The guiding portion 18 guides the operating member 50 and the slider 30 so that the operating member 50 and the slider 30 are reliably slid in the sliding direction. Specifically, the guiding portion 18, in a fitted state in which it is fitted to a guided portion, which will be described later, allows displacement of the slider 30 in the sliding direction while restricting displacement of the slider 30 in the slide restriction direction by restricting the guided portion from both sides with respect to the slide restriction direction. That is, the guiding portion 18 has a first guiding surface that restricts the guided portion from a first side with respect to the slide restriction direction in a state in which it is fitted to the guided portion, and a second guiding surface that restricts the guided portion from a second side that is opposite to the first side with respect to the slide restriction direction in a state in which it is fitted to the guided portion.

In this embodiment, as shown in FIGS. 2 and 3, the guiding portion 18 has a first guiding portion 19 and a second guiding portion 20 that are formed at positions located on opposite sides of the axis of rotation and spaced apart from each other in the slide restriction direction. The guiding portions 19 and 20 each protrude from the opposing surface 12a to the side of the slider 30 (upper side), and have a shape that is elongated in the sliding direction. The first guiding portion 19 has an outer rail portion and an inner rail portion that is formed nearer to the axis of rotation than the outer rail portion is and faces the outer rail portion at a predetermined distance from the outer rail portion. Like the first guiding portion 19, the second guiding portion 20 also has an outer rail portion and an inner rail portion. In other words, the guiding portions 19 and 20 each have the shape of a recess that is open to the side of the slider 30. In the first guiding portion 19, a first guided portion 43, which will be described later, is sandwiched between the outer rail portion and the inner rail portion. In the second guiding portion 20, a second guided portion 44, which will be described later, is sandwiched between the outer rail portion and the inner rail portion. That is to say, in this embodiment, an inner surface 19a of the outer rail portion of the first guiding portion 19 constitutes the first guiding surface, and an inner surface 20a of the outer rail portion of the second guiding portion 20 constitutes the second guiding surface. Alternatively, an outer surface of the inner rail portion of the first guiding portion may constitute the first guiding surface, and an outer surface of the inner rail portion of the second guiding portion 20 may constitute the second guiding surface.

The restricting portion restricts displacement of the slider 30 in the direction (upward direction) away from the base main body 11. More specifically, the restricting portion prevents displacement of the slider 30 in the direction away from the base main body 11 while allowing sliding of the slider 30 in the sliding direction relative to the restricting portion.

In this embodiment, the restricting portion includes first to fourth restricting portions 21 to 24. The first to fourth restricting portions 21 to 24 are each located outside the guiding portion 18 with respect to the slide restriction direction and have a shape that protrudes from the opposing surface 12a to the side of the slider 30 (upper side). As shown in FIG. 3, the first restricting portion 21 is formed outside the first guiding portion 19 (forward of the first guiding portion 19) with respect to the slide restriction direction. The second restricting portion 22 is formed outside the second guiding portion 20 with respect to the slide restriction direction. The third restricting portion 23 is formed at a position that is located outside the first guiding portion 19 with respect to the slide restriction direction and at a distance from the first restricting portion 21 to the right side with respect to the sliding direction. The fourth restricting portion 24 is formed at a position that is located outside the second guiding portion 20 with respect to the slide restriction direction and at a distance from the second restricting portion 22 to the right side with respect to the sliding direction.

Figure 7:
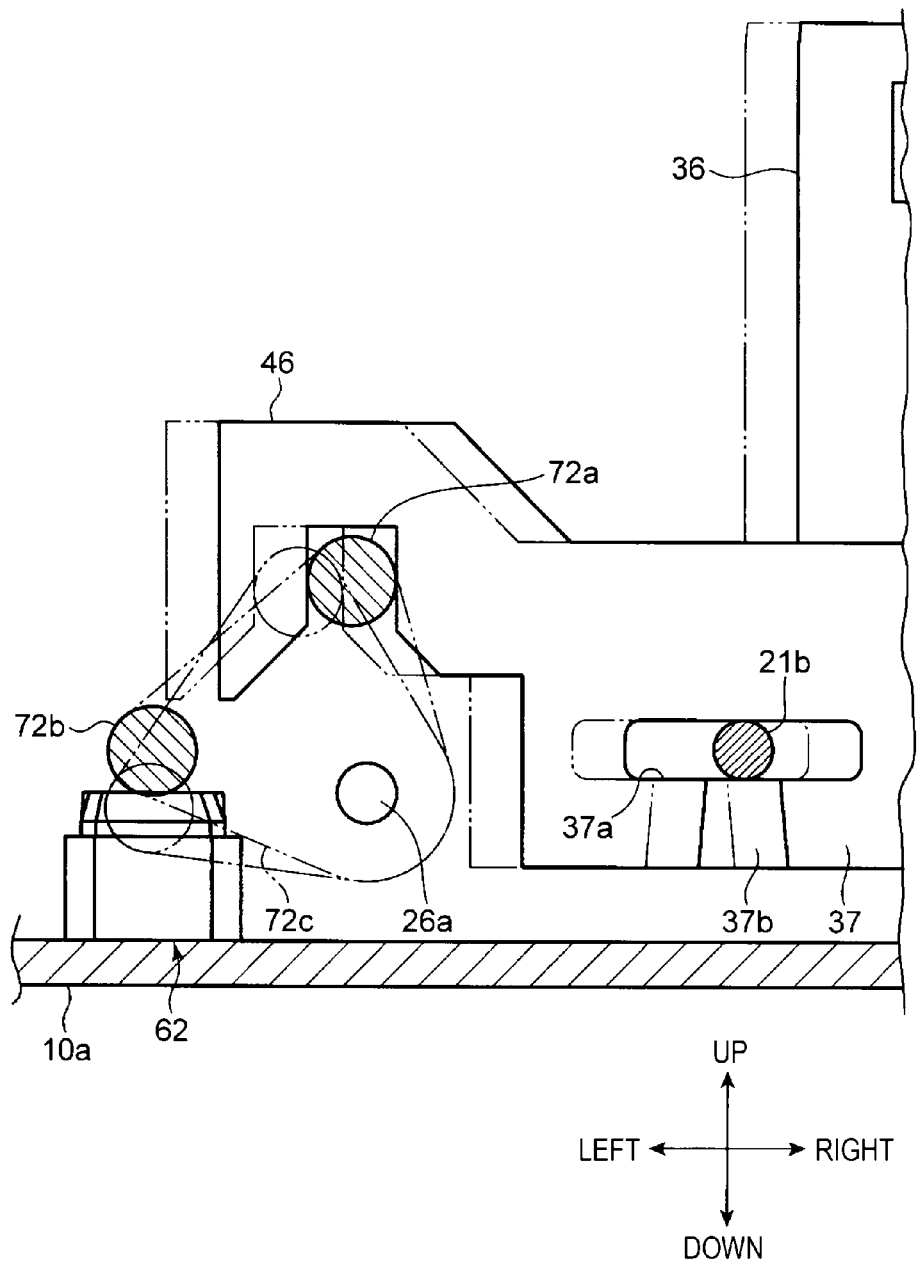
FIG. 7 is a diagram showing a behavior of the transmission member.

The first restricting portion 21 has a first upright protruding piece 21a protruding upright from the opposing surface 12a to the side of the slider 30, and a first sliding contact portion 21b (sliding contact portion) protruding inward (rearward) in the slide restriction direction from the first upright protruding piece 21a. The first upright protruding piece 21a has a shape that can be deformed to bend so as to allow the first sliding contact portion 21b to be displaced outward (forward) in the slide restriction direction, which also corresponds to the first bending deformation direction. As shown in FIGS. 2 and 7, the first sliding contact portion 21b has a cylindrical shape with a central axis extending in a direction parallel to the slide restriction direction. The first sliding contact portion 21b slides on a first restricted surface 37a, which will be described later, in the sliding direction while coming into line contact with the first restricted surface 37a. That is to say, the first sliding contact portion 21b comes into contact with the first restricted surface 37a from the side (upper side) that is opposite to the opposing surface 12a, thereby restricting displacement of the slider 30 in a direction away from the base 10, and also comes into sliding contact with the first restricted surface 37a in the sliding direction, thereby allowing the slider 30 to slide.

The second restricting portion 22 is plane-symmetrical to the first restricting portion 21, where a parallel plane that is parallel to the sliding direction and passes through the axis of rotation is the plane of symmetry. That is, the second restricting portion 22 has a second upright protruding piece 22a protruding upright from the opposing surface 12a to the side of the slider 30, and a second sliding contact portion 22b (sliding contact portion) protruding inward (to the side of the first restricting portion 21) in the slide restriction direction from the second upright protruding piece 22a. Note that the second upright protruding piece 22a and the second sliding contact portion 22b also are plane-symmetrical to the first upright protruding piece 21a and the first sliding contact portion 21b, where the parallel plane is the plane of symmetry, and so a description of the second upright protruding piece 22a and the second sliding contact portion 22b will be omitted.

The third restricting portion 23 is plane-symmetrical to the first restricting portion 21, where the orthogonal plane is the plane of symmetry. Thus, the third bending deformation direction is defined, similarly to the first bending deformation direction, as also corresponding to the slide restriction direction. The fourth restricting portion 24 is plane-symmetrical to the second restricting portion 22, where the orthogonal plane is the plane of symmetry. In other words, the third restricting portion 23 corresponds to a figure produced by a translation of the first restricting portion 21 to the right, and the fourth restricting portion 24 corresponds to a figure produced by a translation of the second restricting portion 22 to the right. Therefore, a description of the third restricting portion 23 and the fourth restricting portion 24 will be omitted.

Note that although the restricting portion of this embodiment has the first to fourth restricting portions 21 to 24, it is sufficient that the restricting portion has at least one restricting portion.

The first transmission member retaining portion 25 is formed forward of the parallel plane and rightward of the third restricting portion 23. More specifically, the first transmission member retaining portion 25 is formed between the slider 30 and the first hole 12b. The first transmission member retaining portion 25 has a center shaft 25a having a shape extending in the slide restriction direction. The second transmission member retaining portion 26 is plane-symmetrical to the first transmission member retaining portion 25, where the orthogonal plane is the plane of symmetry. That is, the second transmission member retaining portion 26 has a center shaft 26a having a shape extending in the slide restriction direction (see FIGS. 1 and 6).

The first stopper portion 27 has a shape protruding from the opposing surface 12a to the side of the slider 30 (upper side). As shown in FIG. 3, the first stopper portion 27 is formed rearward of the parallel plane and rightward of the slider 30. The first stopper portion 27 defines a right end (stroke end of the operating member 50) of sliding of the slider 30 in the sliding direction. That is, when the slider 30 slides to the right, the first stopper portion 27 abuts against the slider 30, thereby restricting sliding of the slider 30. The second stopper portion 28 is plane-symmetrical to the first stopper portion 27, where the orthogonal plane is the plane of symmetry. Therefore, a description of the second stopper portion 28 will be omitted.

The slider 30 has a retaining portion 31 that retains the operating member 50, an inner tube portion 32 that is formed inside the retaining portion 31, a bottom wall 33, an opposing wall 34 that faces the upper wall 14, the second engagement portion 35 that has a shape engageable with the first engagement portion 17, an attachment tube portion 36 to which the operating member 50 is attached, a restricted wall that is restricted by the restricting portion, a first transmission member pressing portion 39 that presses against the first transmission member 71, a second transmission member pressing portion 40 that presses against the second transmission member 72, a first abutment wall 41 that abuts against the first stopper portion 27, a second abutment wall 42 that abuts against the second stopper portion 28, the guided portion that is guided by the guiding portion 18, a first clamp portion 45 that holds the first transmission member 71 from both sides, and a second clamp portion 46 that holds the second transmission member 72 from both sides.

The retaining portion 31 has a cylindrical shape that is coaxial with the axis of rotation, and retains the operating member 50 from outside such that the operating member 50 is rotatable about the axis of rotation. The retaining portion 31 has a larger shape than the operating member 50. That is, the operating member 50 is rotatably retained inside the retaining portion 31.

The inner tube portion 32 is formed inside the retaining portion 31. The inner tube portion 32 has a cylindrical shape that is coaxial with the axis of rotation and is smaller than the retaining portion 31.

The bottom wall 33 connects a lower end of the retaining portion 31 to a lower end of the inner tube portion 32. The bottom wall 33 has a flat plate-like shape and faces the opposing surface 12a while being oriented such that it is parallel to the opposing surface 12a.

The opposing wall 34 has a circular plate-like shape that closes an upper end of the inner tube portion 32, and is parallel to the bottom wall 33.

Figure 4:
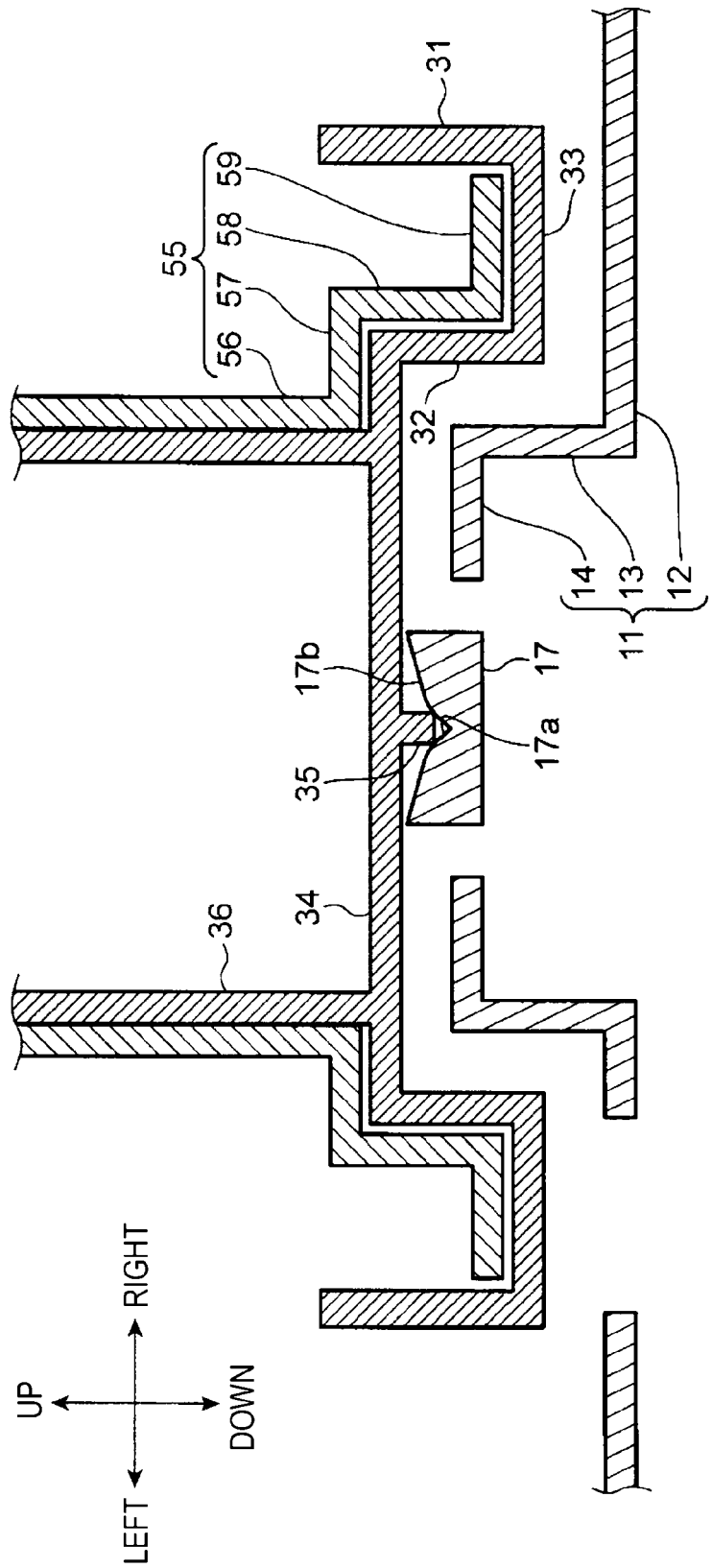
FIG. 4 is a cross-sectional view taken along line IV-IV in FIG. 3.
Figure 5:
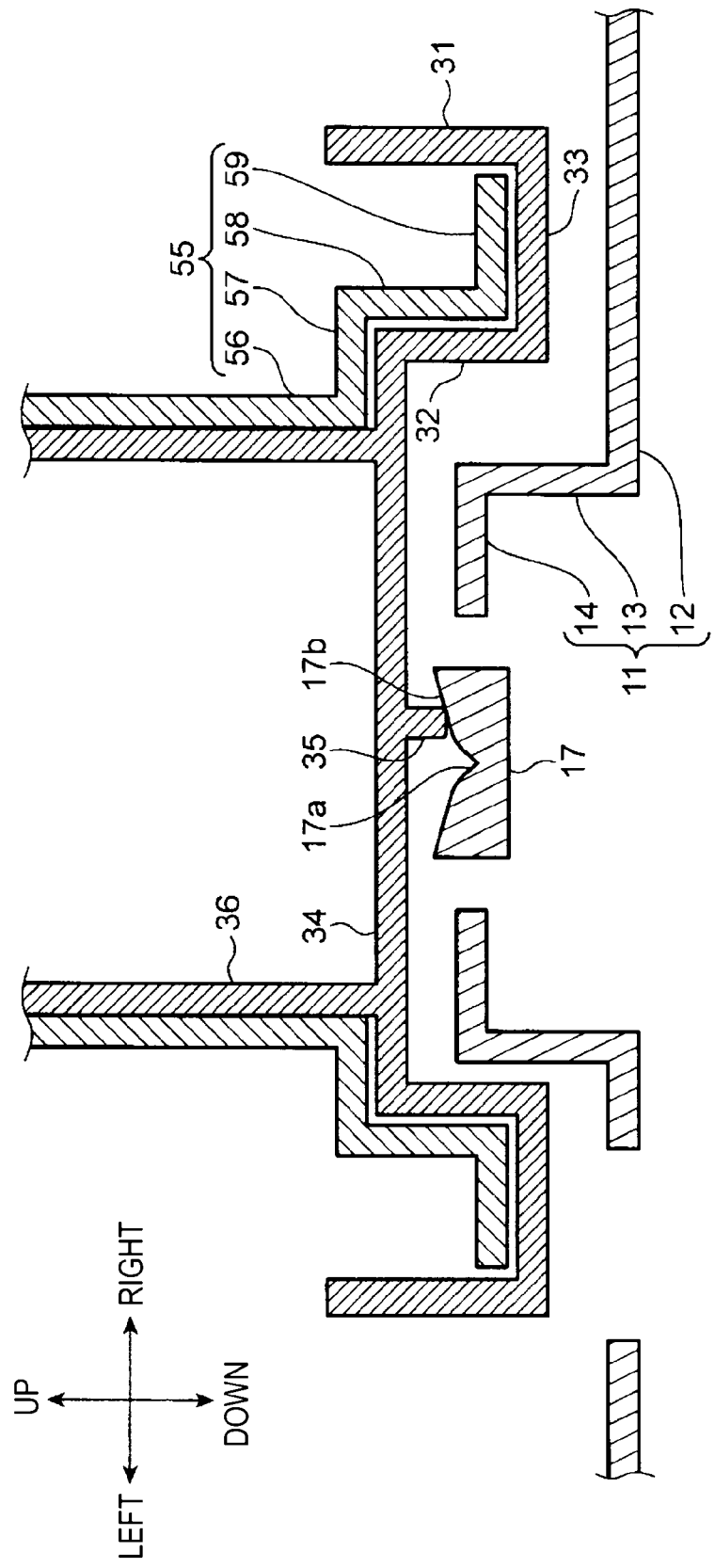
FIG. 5 is a cross-sectional view showing a relationship between a first engagement portion and a second engagement portion.

The second engagement portion 35 protrudes from the opposing wall 34 to the side of the upper wall 14 (lower side), and has a shape that passes through the center of the opposing wall 34 and is elongated in the slide restriction direction. In this embodiment, the second engagement portion 35 includes a locked portion that is locked into the locking portion 17a of the first engagement portion 17. When no operating force in the sliding direction is applied to the operating member 50, the locked portion of the second engagement portion 35 is locked into the locking portion 17a, and therefore the operating member 50 and the slider 30 are retained in the neutral position (FIG. 4). Then, when the operating member 50 is operated in the sliding direction, the locked portion slides on the sliding surface 17b in the sliding direction and simultaneously presses the first engagement portion 17 to the side of the opposing surface 12a (lower side), thereby causing bending deformation of the flexible piece 16 (FIG. 5).

The attachment tube portion 36 has a cylindrical shape that is coaxial with the axis of rotation and is smaller than the inner tube portion 32. The attachment tube portion 36 extends upward from the opposing wall 34.

The restricted wall is a part of the slider 30 that is restricted by the restricting portion. Specifically, the restricted wall has a restricted surface, which is a surface that faces the side (upper side) that is opposite to the opposing surface 12a and extends parallel to the sliding direction and that is restricted by the restricting portion. In the fitted state, the restricted surface comes into contact with the sliding contact portion from the lower side of the sliding contact portion.

Figure 8:
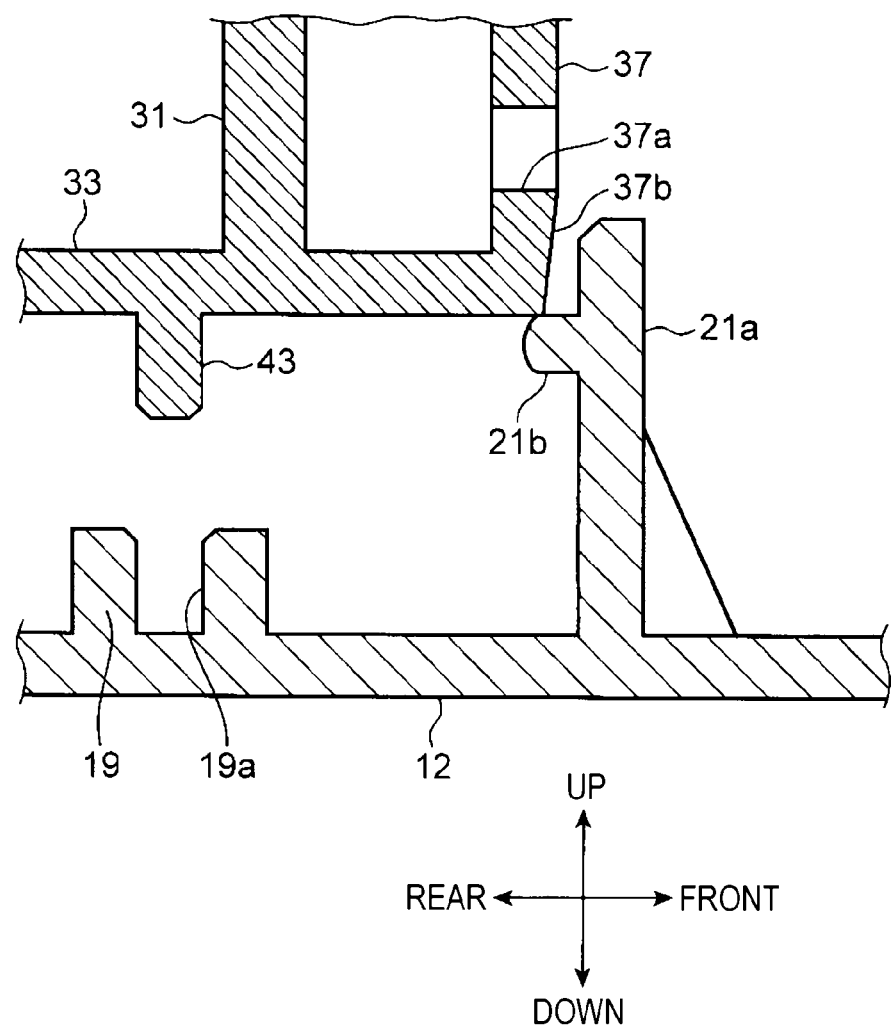
FIG. 8 is a diagram showing mounting of a slider to a base in the same cross section as in FIG. 2.
Figure 9:
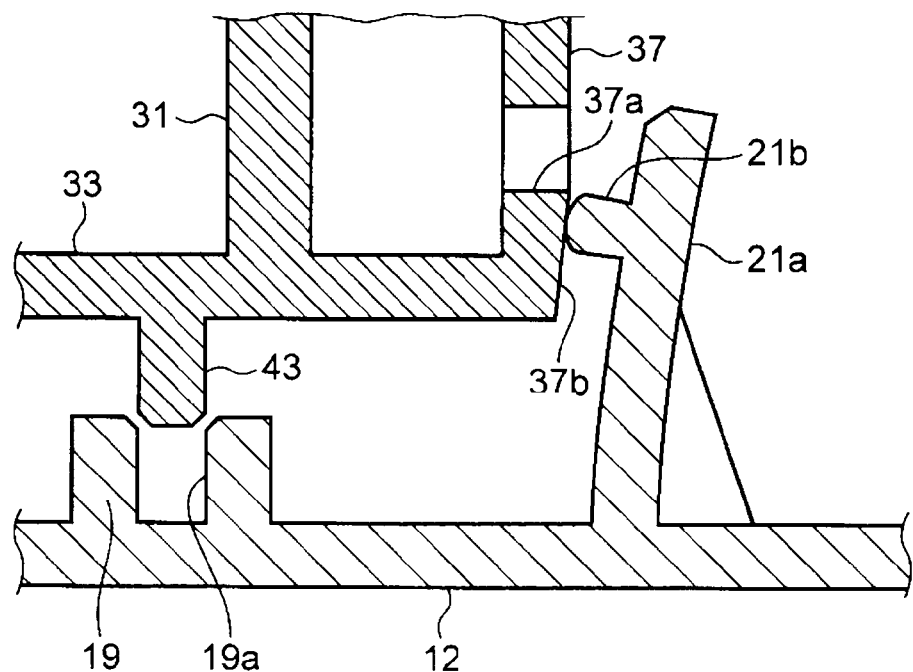
FIG. 9 is a diagram showing a state in which mounting of the slider to the base has proceeded from the state in FIG. 8.
Figure 9:
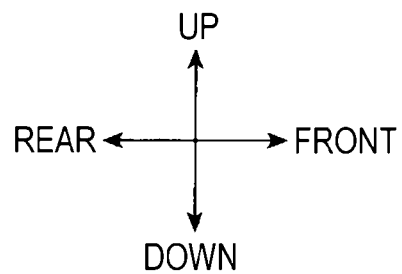

In this embodiment, the restricted wall includes a first restricted wall 37 that is restricted by the first and third restricting portions 21 and 23 as well as a second restricted wall 38 that is restricted by the second and fourth restricting portions 22 and 24. The first restricted wall 37 has a shape that is elongated in a direction parallel to the sliding direction. The first restricted wall 37 is in contact with the retaining portion 31 at a front end portion of the retaining portion 31. As shown in FIGS. 2, 3, and 7, the first restricted wall 37 has a first slot that can receive the first sliding contact portion 21b and that has a shape elongated in the sliding direction. The slider 30 is capable of sliding in the sliding direction in a state in which the first sliding contact portion 21b is received in the first slot. That is, the dimension of the first slot in its lengthwise direction (left-right direction) is set to a dimension that allows sliding of the slider 30 in the left-right direction. An inner circumferential surface surrounding the first slot of the first restricted wall 37 has the first restricted surface 37a that comes into contact with a lower end of the first sliding contact portion 21b when the slider 30 is displaced in the direction away from the base 10. In other words, a lower surface of the inner circumferential surface surrounding the first slot of the first restricted wall 37 constitutes the first restricted surface 37a. As a result of the first restricted surface 37a coming into contact with the first sliding contact portion 21b, displacement of the slider 30 in the direction away from the base 10 is restricted. In addition, as shown in FIGS. 7 to 9, the first restricted wall 37 has a first inclined portion 37b that is formed in an outer surface of the first restricted wall 37 under the first slot. The first inclined portion 37b is formed in order to facilitate attachment of the slider 30 to the base 10. Specifically, the first inclined portion 37b has a shape in which the thickness (dimension in the front-rear direction) of the first restricted wall 37 gradually decreases from the first slot toward the lower end. These aspects also hold true on the side of the third restricting portion 23.

The second restricted wall 38 has a shape that is elongated in the direction parallel to the sliding direction. The second restricted wall 38 is in contact with the retaining portion 31 at a rear end portion of the retaining portion 31. As shown in FIGS. 2 and 3, the second restricted wall 38 has a second slot that can receive the second sliding contact portion 22b, a second restricted surface 38a that comes into contact with the second sliding contact portion 22b, and a second inclined portion. The second slot, the second restricted surface 38a, and the second inclined portion of the second restricted wall 38 are plane-symmetrical to the first slot, the first restricted surface 37a, and the first inclined portion 37b of the first restricted wall 37, where the parallel plane is the plane of symmetry. This also holds true on the side of the fourth restricting portion 24.

The first transmission member pressing portion 39 has a shape that is elongated in the direction parallel to the slide restriction direction, and connects a right end portion of the first restricted wall 37 to an outer circumferential surface of the retaining portion 31. The first transmission member pressing portion 39 is continuous with the outer circumferential surface of the retaining portion 31 at a location inward of the right end portion of the retaining portion 31, and also is perpendicular to the opposing surface 12a. When the operating member 50 is operated to slide to the right, the first transmission member pressing portion 39 presses the first transmission member 71 to the right. The second transmission member pressing portion 40 is plane-symmetrical to the first transmission member pressing portion 39, where the orthogonal plane is the plane of symmetry, and so a description of the second transmission member pressing portion 40 will be omitted.

The first abutment wall 41 has a shape that is elongated in the direction parallel to the slide restriction direction, and connects a right end portion of the second restricted wall 38 to the outer circumferential surface of the retaining portion 31. The first abutment wall 41 is in contact with the retaining portion 31 at a right end portion of the retaining portion 31. The operating member 50 is allowed to slide to the right in the sliding direction until the first abutment wall 41 abuts against the first stopper portion 27. The second abutment wall 42 is plane-symmetrical to the first abutment wall 41, where the orthogonal plane is the plane of symmetry, and so a description of the second abutment wall 42 will be omitted.

The guided portion is fitted into the guiding portion 18 and thus guided by the guiding portion 18 so as to slide in the sliding direction. The guided portion is shaped such that the guided portion can be removably fitted into the guiding portion 18 in a direction parallel to the axis of rotation and is guided by the guiding portion 18 in the sliding direction in the fitted state.

In this embodiment, the guided portion includes the first guided portion 43 that is guided by the first guiding portion 19 and the second guided portion 44 that is guided by the second guiding portion 20. The first guided portion 43 is shaped such that the first guided portion 43 can be removably fitted into the first guiding portion 19 in the direction parallel to the axis of rotation and can be guided in the sliding direction by the first guiding portion 19 in the fitted state (the state shown in FIG. 2). Specifically, the first guided portion 43 protrudes from the bottom wall 33 toward the opposing surface 12a (lower side) and has a shape that is elongated in the sliding direction. In a state in which the first guided portion 43 is fitted into the first guiding portion 19, the first guided portion 43 is sandwiched by the outer rail portion and the inner rail portion of the first guiding portion 19 from both sides in the slide restriction direction and thus restricted so as not to be displaced in the slide restriction direction, but is allowed to slide in the sliding direction relative to these rail portions.

The second guided portion 44 is positioned symmetrically to the first guided portion 43 with respect to the parallel plane. In addition, as shown in FIG. 3, the second guided portion 44 has a shape that is symmetrical to the first guided portion 43 with respect to the parallel plane except that its length in the sliding direction is larger than that of the first guided portion 43. Therefore, a description of the second guided portion 44 will be omitted.

Note that each of the inner rail portion of the first guiding portion 19 and the inner rail portion of the second guiding portion 20 can be omitted. In that case, the inner surface (first guiding surface) 19a of the outer rail portion of the first guiding portion 19 restricts the first guided portion 43 from outside with respect to the slide restriction direction, and the inner surface (second guiding surface) 20a of the outer rail portion of the second guiding portion 20 restricts the second guided portion 44 from outside with respect to the slide restriction direction. Alternatively, each of the outer rail portion of the first guiding portion 19 and the outer rail portion of the second guiding portion 20 can be omitted. In that case, the outer surface (first guiding surface) of the inner rail portion of the first guiding portion 19 restricts the first guided portion 43 from inside with respect to the slide restriction direction, and the outer surface (second guiding surface) of the inner rail portion of the second guiding portion 20 restricts the second guided portion 44 from inside with respect to the slide restriction direction.

The first clamp portion 45 has a shape that holds the first transmission member 71, more specifically, a pressed portion 71a, which will be described later, between the first clamp portion 45 and the first transmission member pressing portion 39 from both sides in the sliding direction. Specifically, the first clamp portion 45 has an opposing piece 45a that faces the first transmission member pressing portion 39 and is spaced apart from the first transmission member pressing portion 39 by a distance that is necessary for the pressed portion 71a to be held between the opposing piece 45a and the first transmission member pressing portion 39, as well as a connecting piece 45b that connects an upper end of the first transmission member pressing portion 39 to an upper end of the opposing piece 45a. The opposing piece 45a is perpendicular to the opposing surface 12a. The connecting piece 45b is parallel to the opposing surface 12a. The second clamp portion 46 is plane-symmetrical to the first clamp portion 45, where the orthogonal plane is the plane of symmetry, and so a description of the second clamp portion 46 will be omitted.

The operating member 50 is retained by the slider 30 so as to be rotatable about the axis of rotation, and also is operable to slide so that it slides in the sliding direction together with the slider 30. The operating member 50 has a dial 51 that is operable to rotate and to slide by an operator, and an inner member 55 that is connected to the dial 51 so as to simultaneously rotate with the dial 51. Note that although the dial 51 and the inner member 55 of this embodiment are composed of separate members, the dial 51 and the inner member 55 may also be formed as a single member. Moreover, the dial 51 may be omitted. In that case, it is preferable that the inner member 55 has a shape whose upper end is closed.

The dial 51 has a cylindrical gripped portion 52 to be gripped by the operator, a circular plate-shaped top wall 53 that closes an upper end of the gripped portion 52, and a inner member connecting portion 54 that is connected to the inner member. The gripped portion 52 is coaxial with the axis of rotation. The inner member connecting portion 54 has a cylindrical shape that is smaller than the gripped portion 52 and is coaxial with the axis of rotation. The inner member connecting portion 54 extends downward from a position on a lower surface of the top wall 53 that is located inward (on the side of the axis of rotation) of the gripped portion 52.

The inner member 55 has a tubular dial connecting portion 56 that is connected to the dial 51, a first projecting portion 57 projecting outward in a radial direction from the entire circumference of a lower end of the dial connecting portion 56, an outer tube portion 58 having a tubular shape extending downward from an outer edge of the first projecting portion 57, and a second projecting portion 59 projecting outward in the radial direction from a lower end of the outer tube portion 58. The dial connecting portion 56 has a larger shape than the inner member connecting portion 54. The dial connecting portion 56 is connected to the inner member connecting portion 54 so as to be incapable of relative rotation with respect to the inner member connecting portion 54. The outer tube portion 58 has a larger diameter than the inner tube portion 32. The second projecting portion 59 has a shape that fits between an inner surface of the retaining portion 31 and an outer surface of the inner tube portion 32 and is supported on the bottom wall 33.

The first detecting element 61 detects that the operating member 50 has been slid to a specific sliding operation position that is located on the right side in the sliding direction. The first detecting element 61 is fixed in the first hole 12b while being oriented in such a manner that it can detect displacement of the first transmission member 71 to the side of the opposing surface 12a (element pressing direction). In this embodiment, a tactile switch is used as the first detecting element 61. The second detecting element 62 detects that the operating member 50 has been slid to a specific sliding operation position that is located on the left side in the sliding direction. The second detecting element 62 is fixed in the second hole 12c while being oriented in such a manner that it can detect displacement of the second transmission member 72 in the element pressing direction. In this embodiment, a tactile switch of the same type as the first detecting element 61 is used as the second detecting element 62.

The first transmission member 71 has a pressed portion 71a that is pressed against by the first transmission member pressing portion 39, an element pressing portion 71b that presses the first detecting element 61 in the element pressing direction, and a pair of plate portions 71c facing each other in the slide restriction direction. The pressed portion 71a has a cylindrical shape with an axis extending in a direction (front-rear direction) parallel to the center shaft 25a of the first transmission member retaining portion 25. The pressed portion 71a is held between the first transmission member pressing portion 39 and the opposing piece 45a. The element pressing portion 71b has the same shape as the pressed portion 71a. The pressed portion 71a and the element pressing portion 71b are each disposed between the pair of plate portions 71c so as to connect the plate portions 71c to each other. The pair of plate portions 71c each have a bearing hole 71d into which the center shaft 25a can be inserted. The bearing hole 71d is formed at a position in each of the pair of plate portions 71c that is spaced apart from a straight line connecting the pressed portion 71a and the element pressing portion 71b. In other words, the pressed portion 71a, the element pressing portion 71b, and the bearing hole 71d are arranged in a triangle. Thus, the first transmission member 71 can rotate about the central shaft 25a in a state in which it is retained by the first transmission member retaining portion 25.

Figure 6:
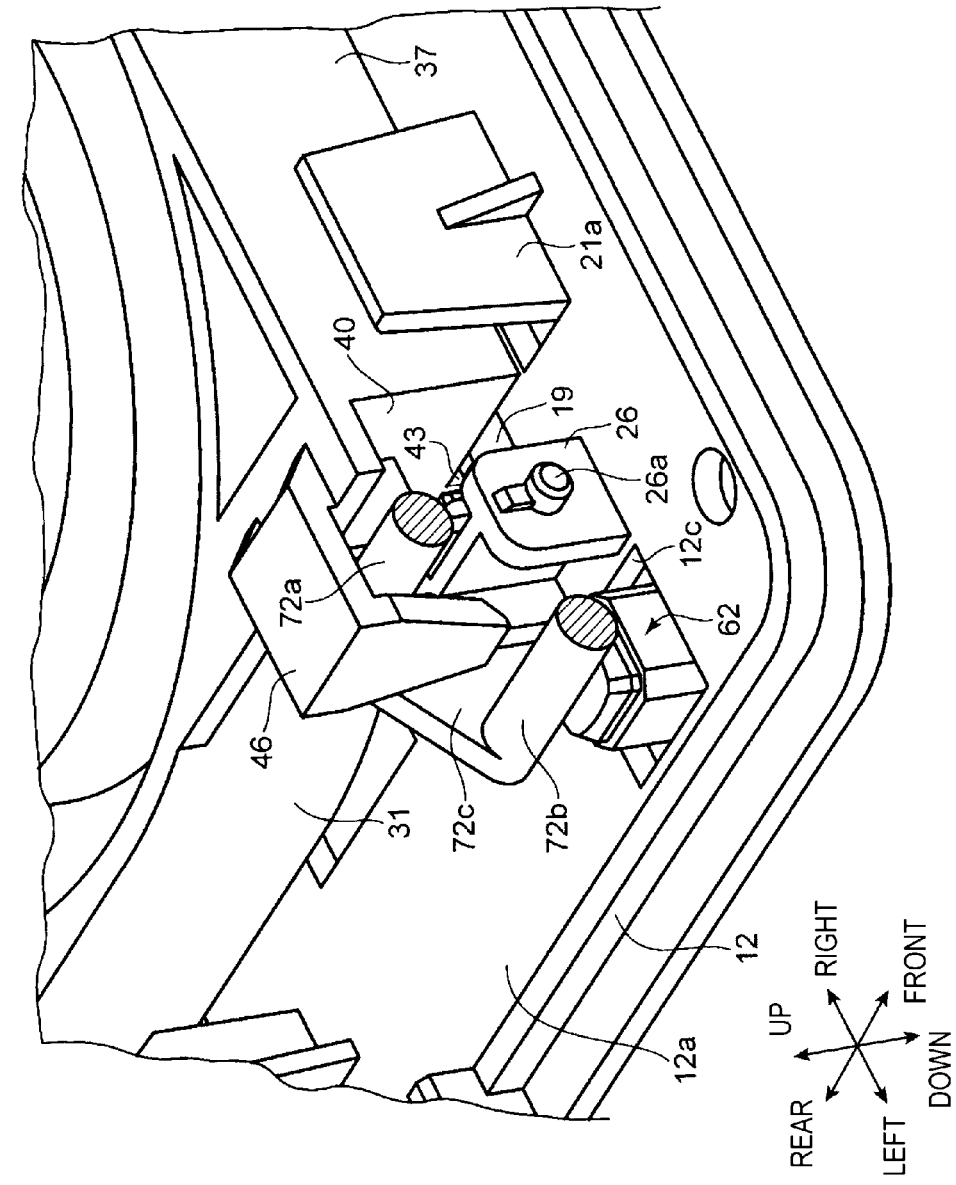
FIG. 6 is a partially cut-away perspective view of a transmission member.

Like the first transmission member 71, the second transmission member 72 has a pressed portion 72a, an element pressing portion 72b, and a pair of plate portions 72c each having a bearing hole 72d (see FIGS. 6 and 7). The second transmission member 72 has a shape that is symmetrical to the first transmission member 71 with respect to the orthogonal plane, and so a description of the second transmission member 72 will be omitted.

The panel 80 has a shape that exposes the dial 51 to the outside and covers the other members, namely, the base 10, the slider 30, the detecting elements 61 and 62, the transmission members 71 and 72, and the inner member 55. Specifically, the panel 80 has an opening having a diameter that is larger than the diameter of the dial connecting portion 56 and smaller than the diameter of the gripped portion 52. As shown in FIGS. 1 and 2, a lower end of the panel 80 is attached to the base 10.

Next, an assembly process of the composite operating device of this embodiment will be described.

First, the base 10 is prepared. The first detecting element 61 is fixed in the first hole 12b of the base 10, and the second detecting element 62 is fixed in the second hole 12c.

Then, the first transmission member 71 is attached to the first transmission member retaining portion 25, and the second transmission member 72 is attached to the second transmission member retaining portion 26. Specifically, the first transmission member 71 is attached to the first transmission member retaining portion 25 so that the center shaft 25a of the first transmission member retaining portion 25 is inserted into the bearing holes 71d of the first transmission member 71. Similarly, the second transmission member 72 is attached to the second transmission member retaining portion 26 so that the center shaft 26a of the second transmission member retaining portion 26 is inserted into the bearing holes 72d of the second transmission member 72.

Subsequently, the slider 30 is mounted to the base 10. Specifically, the slider 30 is brought near to the base 10 while being oriented in such a manner that the second engagement portion 35 faces the first engagement portion 17 and the guided portions 43 and 44 face the respective guiding portions 19 and 20. At this time, the first guided portion 43 approaches the fitting direction in which it is fitted into the first guiding portion 19, the fitting direction also being referred to as the "up-down direction" or "vertical direction." In the process until the first guided portion 43 is fitted into the first guiding portion 19, the lower end of the first restricted wall 37 comes into contact with an upper end of the first sliding contact portion 21b (see FIG. 8). Note that since the second guided portion 44 behaves in the same manner as the first guided portion 43 and the second to fourth restricting portions 22 to 24 behave in the same manner as the first restricting portion 21, a description here will be given taking the side of the first guided portion 43 and the first restricting portion 21 as an example. From this state (the state in FIG. 8), when the slider 30 is brought nearer to the base 10 in the fitting direction, the first sliding contact portion 21b is pressed by the first inclined portion 37b of the slider 30 outward in the slide restriction direction, and thus the first upright protruding piece 21a is deformed to bend so as to allow the outward displacement of the first sliding contact portion 21b in the slide restriction direction (FIG. 9). Here, since the first inclined portion 37b has a shape in which the thickness (dimension in the front-rear direction) of the first restricted wall 37 gradually decreases from the first slot toward the lower end, the slider 30 is easily moved to the fitting direction. Then, when the first guided portion 43 is fitted into the first guiding portion 19, the first upright protruding piece 21a elastically returns to its original position, and thus the first sliding contact portion 21b is inserted into the first slot and abuts against the first restricted surface 37a. That is, the operation of bringing the slider 30 near to the base 10 in the fitting direction is simple, but nevertheless the slider 30 can be mounted so that the slider 30 is allowed to slide in a direction orthogonal to the fitting direction and is inhibited from leaving in a reverse direction of the fitting direction. In other words, a structure in which the operating member 50 and the slider 30 are reliably guided in the sliding direction by the guiding portions 19 and 20 of the base 10 and the guided portions 43 and 44 of the slider 30, as well as a structure in which disengagement of the slider 30 is prevented by the restricting portions 21 to 24 of the base 10 coming into contact with the respective restricted surfaces of the slider 30 are simultaneously constructed.

At this time, that is, when mounting of the slider 30 to the base 10 is finished, the second engagement portion 35 engages with the first engagement portion 17, so that the slider 30 is retained in the neutral position. At the same time, the first clamp portion 45 holds the pressed portion 71a from both sides, and the second clamp portion 46 holds the pressed portion 72a from both sides.

After that, the inner member 55 is mounted to the slider 30. Specifically, the inner member 55 is brought near to the slider 30 so that the dial connecting portion 56 is externally fitted to the attachment tube portion 36. Then, the second projecting portion 59 is received on the bottom wall 33, and thus mounting of the inner member 55 to the slider 30 is finished.

Note that mounting of the inner member 55 to the slider 30 may be performed simultaneously with mounting of the slider 30 to the base 10, or may be performed prior to mounting of the slider 30 to the base 10.

Subsequently, the panel 80 is fixed to the base 10 so that an upper portion of the inner member 55 is exposed through the opening of the panel 80.

Finally, the dial 51 is mounted to the inner member 55 in such a manner that the inner member connecting portion 54 is internally fitted to the dial connecting portion 56.

The composite operating device of this embodiment is assembled by the foregoing process.

Next, operations of the composite operating device when the operating member 50 is operated to slide and when it is operated to rotate will be described in this order.

As shown in FIG. 4, when no operating force in the sliding direction is applied to the operating member 50, the operating member 50 is retained in the neutral position by the locking portion 17a of the flexible portion 15 locking the locked portion of the second engagement portion 35.

When the operating member 50 is operated to slide from the neutral position to, for example, the left in the sliding direction, the slider 30 also slides in the same direction. At this time, as shown in FIG. 5, the locked portion of the second engagement portion 35 leaves the locking portion 17a and presses the sliding surface 17b downward. Thus, the displacement end portion of the flexible piece 16 is deformed to bend downward. Due to the elastic returning force of the flexible piece 16 associated with the bending deformation, the operating member 50 receives a biasing force that acts in the direction (rightward direction) in which the operating member 50 is returned to the neutral position. At this time, as shown in FIG. 7, the pressed portion 72a of the second transmission member 72 is pressed to the left by the second transmission member pressing portion 40. Thus, the second transmission member 72 rotates counterclockwise about the center shaft 26a. This causes the element pressing portion 72b to be displaced in the element pressing direction, and the second detecting element 62 is pressed against by the element pressing portion 72b, so that the leftward sliding operation of the operating member 50 is detected. In addition, at this time, the pressed portion 71a of the first transmission member 71 is pressed to the left by the first clamp portion 45 (the opposing piece 45a). Thus, the first transmission member 71 rotates counterclockwise about the center shaft 25a.

Here, during the sliding operation, the first guided portion 43 is restricted by the first guiding portion 19 from both sides with respect to the slide restriction direction, and the second guided portion 44 is restricted by the second guiding portion 20 from both sides with respect to the slide restriction direction, so that the operating member 50 and the slider 30 are reliably guided so as to slide in the sliding direction. Furthermore, during the sliding operation, the sliding contact portions of the restricting portions 21 to 24 abut against the respective restricted surfaces from the upper side, and thus upward displacement of the slider 30 is restricted.

From this state, that is, the state in which the operating member 50 has been operated to slide to the left, when the sliding operating force acting on the operating member 50 in the leftward direction is removed, the elastic returning force of the flexible piece 16 returns the slider 30 and the operating member 50 to the neutral position. Even at this time, the slider 30 and the operating member 50 are reliably guided in the sliding direction, and upward displacement of the slider 30 is restricted. The foregoing description also applies to the case where the operating member 50 is operated to slide to the right in the sliding direction.

Next, when the operating member 50 in the neutral position is operated to rotate, the inner member 55 rotates about the axis of rotation inside the retaining portion 31. At this time, the second projecting portion 59 presses against a rotation detecting element (a unit switch capable of detecting normal and reverse rotations of the operating member 50), which is not shown, so that the rotating operation of the operating member 50 is detected. During the rotating operation, engagement between the first engagement portion 17 and the second engagement portion 35 reliably retains the operating member 50 in the neutral position.

As described above, with the composite operating device of this embodiment, the structure in which the operating member 50 and the slider 30 are reliably guided in the sliding direction by the guiding portion 18 of the base 10 and the guided portion of the slider 30, as well as the structure in which disengagement of the slider 30 is prevented by the restricting portion of the base 10 coming into contact with the restricted surface of the slider 30 are simultaneously constructed by mounting the slider 30 to the base 10 in the fitting direction. Specifically, the slider 30 has the guided portion, which is shaped such that the guided portion can be removably fitted into the guiding portion 18 in the direction parallel to the axis of rotation and is guided by the guiding portion 18 in the sliding direction in the fitted state. The guiding portion 18 of the base 30 extends in the direction parallel to the sliding direction and has the first guiding surface, which restricts the guided portion in the fitted state from the first side with respect to the slide restriction direction, and the second guiding surface, which restricts the guided portion in the fitted state from the side that is opposite to the first side with respect to the slide restriction direction. Thus, a structure in which the operating member 50 and the slider 30 are reliably guided in the sliding direction without being displaced in the slide restriction direction relative to the base 10 is constructed by mounting the slider 30 to the base 10 so that the guiding portion 18 and the guided portion are in the fitted state. In addition, the slider 30 has the restricted surface, which is a surface that faces the side (upper side) that is opposite to the opposing surface 12a of the base 10 and extends parallel to the sliding direction and that is restricted by the restricting portion. The restricting portion of the base 10 has the sliding contact portion, which, in the fitted state, comes into contact with the restricted surface from the upper side, thereby restricting the slider 30, and comes into sliding contact with the restricted surface in the sliding direction, thereby allowing the slider 30 to slide. Also, the restricting portion is shaped such that, as the slider 30 approaches the opposing surface 12a in the fitting direction in the process until the guided portion is fitted into the guiding portion 18, the restricting portion comes into contact with the slider 30, thereby being deformed to bend in the direction in which the restricting portion is retracted from the slider 30 and allowing movement of the slider 30 in the fitting direction. Thus, a structure in which disengagement of the slider 30 is prevented by the restricting portion coming into contact with the restricted surface is constructed by mounting the slider 30 to the base 10 so that the guiding portion 18 and the guided portion are in the fitted state.

Moreover, with this composite operating device, the slider 30 is restricted from opposite sides of the guiding portions 19 and 20 with respect to the slide restriction direction by the first and second restricting portions 21 and 22. Thus, disengagement of the slider 30 in the fitted state is even more reliably prevented.

Furthermore, with this composite operating device, the first restricting portion 21 and the third restricting portion 23 are plane-symmetrical to each other, where the orthogonal plane is the plane of symmetry, and the second restricting portion 22 and the fourth restricting portion 24 are plane-symmetrical to each other, where the orthogonal plane is the plane of symmetry. Thus, rotation of the slider 30 about a straight line that passes through the slider 30, of straight lines in the orthogonal plane and parallel to the slide restriction direction, is suppressed. Accordingly, rattling of the operating member 50 and the slider 30 during sliding is suppressed.

Moreover, in the above-described embodiment, the first restricted wall 37 has a shape that is elongated in the sliding direction so as to contain one of the tangents to the retaining portion 31 that are parallel to the sliding direction, and the second restricted wall 38 has a shape that is elongated in the sliding direction so as to contain the other of the tangents of the retaining portion 31 that extend in the direction parallel to the sliding direction. Thus, the dimension between the first restricted wall 37 and the second restricted wall 38 is approximately equal to the diameter of the retaining portion 31, or in other words, the minimum length that is necessary for the operating member 50 to be rotatably retained. Accordingly, the dimension of the slider 30 in the slide restriction direction can be minimized.

Moreover, each sliding contact portion comes into line contact with the corresponding restricted surface. Thus, the friction force that acts between the sliding contact portion and the restricted surface is reduced. Accordingly, operating resistance during a sliding operation of the operating member 50 is reduced.

Moreover, in the above-described embodiment, a structure is constructed which retains the operating member 50 in the neutral position by engagement between the first engagement portion 17 of the base 10 and the second engagement portion 35 of the slider 30 and allows the operating member 50 to slide by bending deformation of the flexible portion 15. Thus, the number of components is reduced, and the assembly process is simplified. Specifically, the base 10 includes the flexible portion 15 that is capable of elastic bending deformation in the vertical direction relative to the slider 30, the flexible portion 15 has the first engagement portion 17 that engages with the second engagement portion 35 of the slider 30, and the slider 30 has the second engagement portion 35 that engages with the first engagement portion 17. Accordingly, a structure is constructed in which when no operating force in the sliding direction is applied to the operating member 50, the operating member 50 is retained in the neutral position by the engagement between the locking portion 17a of the first engagement portion 17 and the locked portion of the second engagement portion 35, and when an operating force in the sliding direction is applied to the operating member 50, the flexible piece 16 is deformed to bend so as to allow downward displacement of the first engagement portion 17 that is pressed against by the second engagement portion 35, thereby allowing sliding of the operating member 50 while providing a resistance that acts to retain the operating member 50 in the neutral position.

Moreover, the flexible portion 15 of this embodiment has the flexible piece 16 extending from the base main body 11 in the front-rear direction and being capable of elastic deformation so as to allow displacement of its displacement end portion in the vertical direction, as well as the first engagement portion 17 having a shape that gradually increases in vertical dimension from the neutral position toward both of the outer sides in the sliding direction. Accordingly, when the operating member 50 is operated in the sliding direction and the flexible piece 16 is elastically deformed, the first engagement portion 17 exerts on the second engagement portion 35 resistance forces generated by the flexible piece 16 behaving to cancel the elastic deformation, that is, a resistance force generated by the flexible piece 16 behaving to cancel the vertical displacement of the first engagement portion 17 (i.e., bending deformation of the flexible piece 16) and a resistance force generated by the flexible piece 16 behaving to cancel displacement of the first engagement portion 17 around an intersecting axis coinciding with a straight line, of straight lines parallel to the front-rear direction, that traverses the flexible portion 15 and that intersects the axis of rotation (i.e., torsional deformation of the flexible piece 16). Thus, the operating member 50 is more reliably retained in the neutral position.

Furthermore, the flexible piece 16 of this embodiment is in the form of a cantilever having the base end portion that is continuous with the base main body 11 and the displacement end portion that is an end portion on the side that is opposite to the base end portion and constitutes a free end, and the first engagement portion 17 is formed in the displacement end portion. Thus, it is easy to adjust the amount of displacement of the displacement end portion, or in other words, a retaining force that retains the operating member 50 in the neutral position.

Moreover, in this embodiment, displacement of the slider 30 in the sliding direction is converted into displacement of the transmission members 71 and 72 in the element pressing direction. This displacement is used to press against the detecting elements 61 and 62. Thus, the required overall dimension of the composite operating device in the sliding direction is reduced. Specifically, the first transmission member 71 is retained by the first transmission member retaining portion 25 so that displacement of the slider 30 in the sliding direction is converted into displacement of the first transmission member 71 in the vertical direction, and the first detecting element 61 is fixed to the base 10 while being oriented in such a manner that it can detect displacement of the first transmission member 71 in the vertical direction. Thus, the required overall dimension in the sliding direction that is necessary for detection of displacement of the slider 30 in the sliding direction is reduced. This also holds true on the side of the second transmission member 72 and the second detecting element 62.

Moreover, the transmission member pressing portions 39 and 40 are formed within a region that is sandwiched by a pair of straight lines passing through the two ends of the retaining portion 31 in the slide restriction direction and extending in the direction parallel to the sliding direction. Thus, it is possible to reduce the dimension of the slider 30 in the sliding direction without increasing the dimension of the slider 30 in the slide restriction direction.

Furthermore, the transmission member pressing portions 39 and 40 are formed within a region that is sandwiched by a pair of straight lines passing through the two ends of the retaining portion 31 in the sliding direction and extending in the slide restriction direction. Thus, the required overall dimension of the composite operating device in the sliding direction is reduced even more.

Additionally, the pressed portion 71a of the first transmission member 71 has a cylindrical shape with an axis extending in the direction parallel to the center shaft 25a. The slider 30 has the first clamp portion 45 that holds the pressed portion 71a between the first clamp portion 45 and the first transmission member pressing portion 39 from both sides in the sliding direction. Thus, whenever the slider 30 slides, the first transmission member 71 rotates about the center shaft 25a in conjunction with sliding of the slider 30. Accordingly, the occurrence of a malfunction such as rattling of the first transmission member 71 with respect to the slider 30 is suppressed. Furthermore, when the slider 30 returns to the neutral position from a state in which the first detecting element 61 is pressed against by the first transmission member 71, the element pressing portion 71b of the first transmission member 71 returns to a position in which it is not pressed against the first detecting element 61. Thus, the occurrence of a malfunction, for example, a situation in which even though the slider 30 is located in the neutral position, the first detecting element 61 continues to be pressed against by the first transmission member 71 is suppressed. This also holds true on the side of the second transmission member 72 and the second detecting element 62.

Second Embodiment

A second embodiment will be described with reference to FIG. 10. Note that in the second embodiment, a description will be given only of portions that are different from the first embodiment, and a description of the same structures and effects as those of the first embodiment will be omitted. A composite operating device of the second embodiment is different from the composite operating device of the first embodiment with respect to the shapes of the sliding contact portions and the shapes of the restricted walls. In the description below, the side of the first restricting portion 21 and the first restricted wall 37 will be taken as an example.

Figure 10:
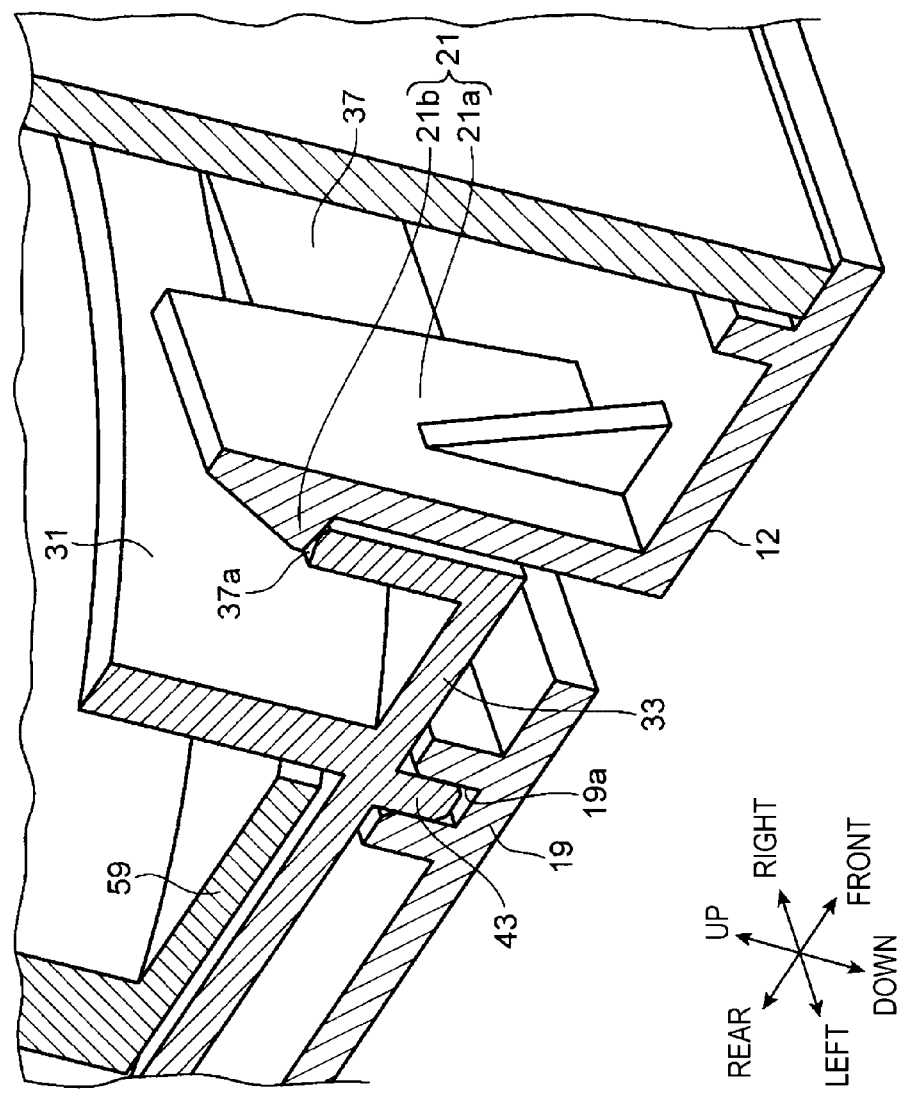
FIG. 10 is an enlarged perspective view showing the vicinity of a first restricting portion of a composite operating device according to a second embodiment.

As shown in FIG. 10, the first sliding contact portion 21b of this embodiment has a shape that gradually decreases in the amount of inward protrusion from the first upright protruding piece 21a as the distance from the opposing surface 12a increases. Moreover, although not shown, the lower surface of the first sliding contact portion 21b has a shape that comes into point or line contact with the first restricted surface 37a.

The upper surface of the first restricted wall 37 constitutes the first restricted surface 37a. The upper surface of the first restricted wall 37 is set at a position lower (closer to the opposing surface 12a) than the upper surface of the retaining portion 31 is. Note that this embodiment is the same as the first embodiment in that when the guided portions 43 and 44 are fitted into the respective guiding portions 19 and 20, the first sliding contact portion 21b abuts against the first restricted surface 37a.

Note that the embodiments disclosed herein are to be considered in all respects as illustrative and not restrictive. The scope of the invention is indicated by the appended claims rather than by the foregoing description of the embodiments, and all changes that come within the meaning and range of equivalency of the claims are intended to be embraced therein.

For example, in the above embodiments, examples in which the guiding portion 18 has the first and second guiding portions 19 and 20 and the slider 30 has the first and second guided portions 43 and 44 have been described. However, one of the first and second guiding portions 19 and 20 may be omitted. In that case, the guided portion on the same side as the omitted guiding portion also is omitted. Here, in the case where the second guiding portion 20 and the second guided portion 44 are omitted, the inner surface of the outer rail portion of the first guiding portion 19 constitutes the first guiding surface and the outer surface of the inner rail portion thereof constitutes the second guiding surface.

Moreover, in the above embodiments, examples in which the restricting portions 21 to 24 restrict the restricted walls 37 and 38 from outside the restricted walls 37 and 38 with respect to the slide restriction direction have been described. However, the restricting portions 21 to 24 may also be configured so as to restrict the restricted walls 37 and 38 from inside the restricted walls 37 and 38 with respect to the slide restriction direction. In that case, the directions in which the sliding contact portions protrude from the respective upright protruding pieces are reverse of those of the above-described embodiments.

What is claimed is:

1. A composite operating device that is configured to rotate about a specific axis of rotation and configured to slide in a specific sliding direction that is transverse to the axis of rotation, the composite operating device comprising:
a base;
a slider that is supported by the base so as to be slidable in the sliding direction relative to the base; and
an operating member that is retained by the slider, the operating member being configured to rotate about the axis of rotation and being configured to slide in the sliding direction together with the slider, wherein
the base comprises:
a base main body having an opposing surface that faces the slider in a direction parallel to the axis of rotation,
a guiding portion protruding from the opposing surface toward the slider and configured to guide the slider in the sliding direction, and
at least one restricting portion protruding from the opposing surface toward the slider at a position spaced apart from the guiding portion in a slide restriction direction that is orthogonal to the sliding direction and restricting displacement of the slider in a direction away from the base main body,
the slider comprises:
a guided portion that is shaped such that the guided portion is removably fitted into a fitted state in contact with the guiding portion in a direction parallel to the axis of rotation and is configured to be guided by the guiding portion in the sliding direction in the fitted state, and
at least one restricted surface, the restricted surface being a surface that faces a side that is opposite to the opposing surface and extends parallel to the sliding direction and that is restricted in movement by the restricting portion,
the guiding portion extends in a direction parallel to the sliding direction and comprises:
a first guiding surface restricting movement of the guided portion in the fitted state from a first side with respect to the slide restriction direction, and a second guiding surface restricting movement of the guided portion in the fitted state from a side that is opposite to the first side with respect to the slide restriction direction, the slider is configured to slide in the sliding direction with the guided portion of the slider being restricted by the first and second guiding surfaces, and the restricting portion comprises a sliding contact portion that, in the fitted state, comes into contact with the restricted surface from the side that is opposite to the opposing surface, thereby restricting movement of the slider, and comes into sliding contact with the restricted surface in the sliding direction, thereby allowing the slider to slide, and the restricting portion is shaped such that, as the slider approaches the opposing surface in a fitting direction in a process until the guided portion is fitted into the guiding portion, the restricting portion comes into contact with the slider, thereby being deformed so as to bend in a direction in which the restricting portion is deformed away from the slider and allowing the slider to move in the fitting direction.

2. The composite operating device according to claim 1, wherein the base comprises, as the restricting portion, a first restricting portion and a second restricting portion that is located on a side of the guiding portion that is opposite to the first restricting portion with respect to the slide restriction direction and protrudes from the opposing surface toward the slider, and the slider comprises, as the restricted surface, a first restricted surface and a second restricted surface that are provided corresponding to the first restricting portion and the second restricting portion, respectively, the first restricting portion comprises, as the sliding contact portion, a first sliding contact portion that, in the fitted state, comes into contact with the first restricted surface from the side that is opposite to the opposing surface, thereby restricting movement of the slider in a direction away from the base main body, and comes into sliding contact with the first restricted surface in the sliding direction, thereby allowing the slider to slide, and being shaped such that, as the slider approaches the opposing surface in the fitting direction in the process until the guided portion is fitted into the guiding portion, the first restricting portion comes into contact with the slider, thereby being deformed so as to bend in a first bending deformation direction in which the first restricting portion is deformed away from the slider and allowing the slider to move in the fitting direction, and the second restricting portion comprises, as the sliding contact portion, a second sliding contact portion that, in the fitted state, comes into contact with the second restricted surface from the side that is opposite to the opposing surface, thereby restricting movement of the slider in a direction away from the base main body, and comes into sliding contact with the second restricted surface in the sliding direction, thereby allowing the slider to slide, and being shaped such that, as the slider approaches the opposing surface in the fitting direction in the process until the guided portion is fitted into the guiding portion, the second restricting portion comes into contact with the slider, thereby being deformed so as to bend in a direction opposite to the first bending deformation direction and allowing the slider to move in the fitting direction.

3. The composite operating device according to claim 2, wherein the base further comprises, as the restricting portion, a third restricting portion that is located on a side of transverse plane that is opposite to the first restricting portion with respect to the sliding direction, the transverse plane containing the axis of rotation and being transverse to the sliding direction, and that protrudes from the opposing surface toward the slider and a fourth restricting portion that is located on a side of the transverse plane that is opposite to the second restricting portion with respect to the sliding direction and that protrudes from the opposing surface toward the slider, and the slider further comprises, as the restricted surface, a third restricted surface and a fourth restricted surface that are provided corresponding to the third restricting portion and the fourth restricting portion, respectively, the third restricting portion comprises, as the sliding contact portion, a third sliding contact portion that, in the fitted state, comes into contact with the third restricted surface from the side that is opposite to the opposing surface, thereby restricting movement of the slider in a direction away from the base main body, and comes into sliding contact with the third restricted surface in the sliding direction, thereby allowing the slider to slide, and being shaped such that, as the slider approaches the opposing surface in the fitting direction in the process until the guided portion is fitted into the guiding portion, the third restricting portion comes into contact with the slider, thereby being deformed so as to bend in a third bending deformation direction in which the third restricting portion is retracted from the slider and allowing the slider to move in the fitting direction, and the fourth restricting portion comprises, as the sliding contact portion, a fourth sliding contact portion that, in the fitted state, comes into contact with the fourth restricted surface from the side that is opposite to the opposing surface, thereby restricting movement of the slider in a direction away from the base main body, and comes into sliding contact with the fourth restricted surface in the sliding direction, thereby allowing the slider to slide, and being shaped such that, as the slider approaches the opposing surface in the fitting direction in the process until the guided portion is fitted into the guiding portion, the fourth restricting portion comes into contact with the slider, thereby being deformed so as to bend in a direction opposite to the third bending deformation direction and allowing the slider to move in the fitting direction.

4. The composite operating device according to claim 2, wherein the slider comprises a cylindrical retaining portion that rotatably retains the operating member, a first restricted wall that includes the first restricted surface, and a second restricted wall that includes the second restricted surface, the first restricted wall having a shape extending in the sliding direction so as to contain a first tangent to the retaining portion that extends in a direction parallel to the sliding direction, and the second restricted wall having a shape extending in the sliding direction so as to contain a second tangent to the retaining portion that extend in the direction parallel to the sliding direction.

5. The composite operating device according to claim 1, wherein the guiding portion comprises a first guiding portion that is spaced apart from the axis of rotation in the slide restriction direction and comprises the first guiding surface, and a second guiding portion that is positioned on a side of the axis of rotation that is opposite to the first guiding portion and comprises the second guiding surface.

6. The composite operating device according to claim 1, wherein the sliding contact portion has a shape that comes into point or line contact with the restricted surface.

7. The composite operating device according to claim 1, wherein the slide direction is orthogonal to the axis of rotation.

8. The composite operating device according to claim 7, wherein the transverse plane containing the axis of rotation is orthogonal the sliding direction.

* * * * *